A. L. CARROLL.
CAR WHEEL.
APPLICATION FILED OCT. 1, 1920.
1,367,800.
Patented Feb. 8, 1921.
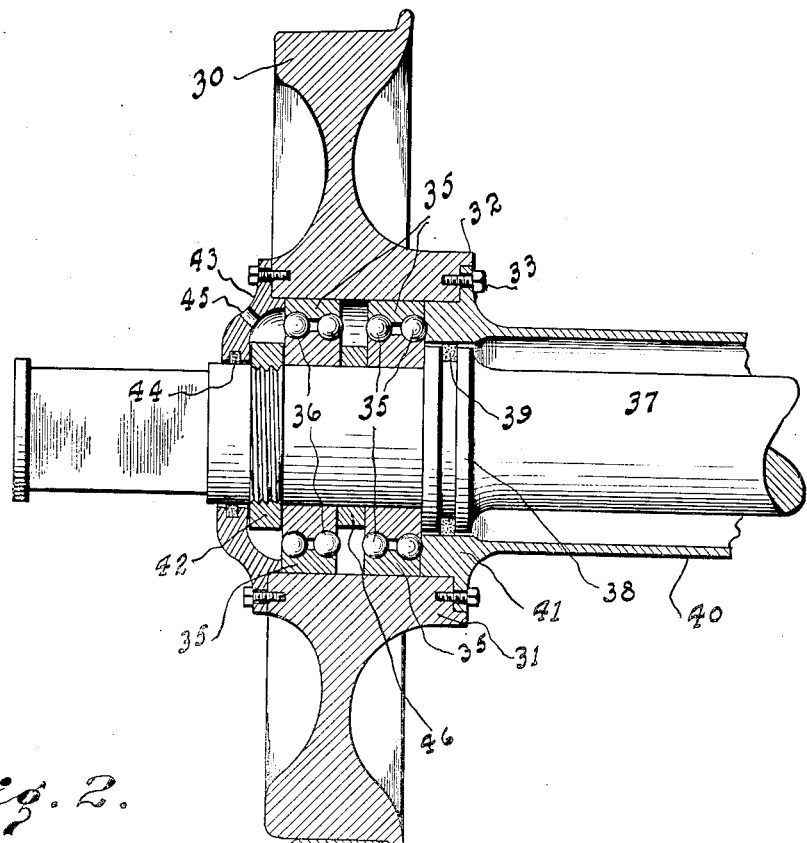
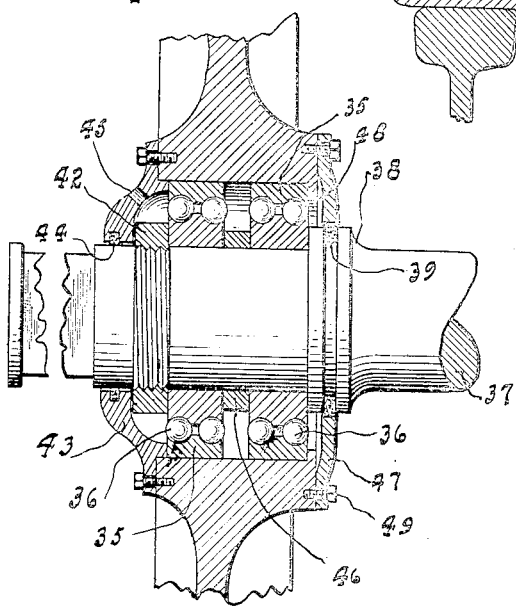
Inventor
Andrew L. Carroll
By Lacy & Lacy, Attorneys

UNITED STATES PATENT OFFICE.

ANDREW L. CARROLL, OF ST. LOUIS, MISSOURI.

CAR-WHEEL.

1,367,800.  Specification of Letters Patent.  Patented Feb. 8, 1921.

Application filed October 1, 1920. Serial No. 413,985.

*To all whom it may concern:*

Be it known that I, ANDREW L. CARROLL, a citizen of the United States, residing in the city of St. Louis and State of Missouri, have invented certain new and useful Improvements in Car-Wheels, of which the following is a specification.

The object of this invention is to improve the riding qualities of car wheels and to reduce the cost of upkeep by providing a construction which will permit the worn out tread portion of a wheel to be removed readily from the axle and a new tread member substituted therefor. The invention also seeks to facilitate the lubrication of the car wheel bearing all of which will be hereinafter particularly set forth.

In the drawing—

Figure 1 is a transverse section of a car wheel embodying my present improvements in position upon an axle;

Fig. 2 is a similar view showing a slightly different form of the invention.

The car wheel 30 has the usual tread configuration and has its central portion bored to receive bearings and permit the ready assemblage of the bearings with the axle. At its center, concentric with the central bore or opening, upon the inner side of the wheel is provided an annular extension or flange 31 having a longitudinally extending annular rib 32. The axle 37 is provided with an annular shoulder or enlargement 38 provided with a circumferential groove in which is fitted a felt or other elastic washer 39 which will fit closely against the inner opposed surface of a casing 40 which extends between the wheels at the opposite ends of the axle and incloses the axle, as shown and as will be readily understood. The housing is provided with a radially extending annular flange 41 through which fastening bolts 33 are inserted into the extension 31 to secure the housing in place, the edge of the flange 41 fitting against the rib 32, as clearly shown, and the end of the housing fitting within the bore or circular opening of the wheel. The housing serves to maintain the wheels of a pair of wheels in fixed spaced relation so that they will always properly engage the track rails and also constitutes a closure to retain lubricant within the bore of the wheel, the washer 39 preventing the escape of the lubricant into the housing. At the outer side of the annular flange 38, the axle is provided with a smooth circular portion upon which is fitted race rings coacting with similar race rings 35 fitted within the bore of the wheel, the two race rings serving to retain anti-friction bearing balls 36 in place. Preferably, two pairs or sets of race rings are provided and they are spaced apart by a suitable washer or collar, 46, as shown. At the outer end of the circular smooth portion of the axle is a threaded section which receives a collar or nut 42 adapted to be turned home against the outer race ring so as to secure the bearings against the flange 38 and the end of the housing 40 and prevent movement of the same longitudinally upon the axle. Beyond the threaded portion of the axle is another smooth portion and the extremity of the axle is preferably angular in cross section so as to be received within a suitable box or support secured upon the car truck. Around the axle, at the outer side of the threaded portion thereof, is a cap 43 which carries a felt or similar washer 44 bearing closely against the axle and is provided with an opening 45 through which lubricant may be supplied to the bearing. This cap 43 is provided with an annular rib on its inner side which fits within the central opening of the wheel and against the outer face ring 35, while the edge of the cap bears against the outer side of the wheel and is secured thereto by cap screws or bolts, as shown. It will be noted that the cap 43 fits over the nut 42 and incloses the same so that it tends to prevent the working loose of the nut and lubricant may be supplied to the bearing through the opening 45 in any preferred manner. A convenient method is to fill the space surrounding the nut and defined by the cap with saturated cotton waste, but a constant supply of lubricant may be utilized by establishing suitable connections with a supply reservoir upon any convenient portion of the car and connecting said reservoir with the opening 45 through a conveyer having a joint or section which is movable relative to the tank but in constant communication therewith.

In Fig. 2, I have shown a form of the invention in which the casing 40 is omitted and, in lieu thereof, a cap 47 is employed, the felt washer 39 being arranged within the annular groove of the enlargement 38 and filling the space defined by the same and the inner circular edge of the cap. The hub portion or bore of the wheel is provided with an annular radially extending rib or flange 48 at its inner end which bears against the adjacent race ring 35 and the cap 47 is secured against the inner side of the wheel by cap screws 49 inserted through the cap into the wheel adjacent the edge of the cap. Otherwise, the construction is the same as that shown in Fig. 1. This form is sometimes preferred as it permits the wheels to rotate independently.

My present invention provides a car wheel which will obviously rotate easily about the axle and will not need lubrication as often as the wheels now generally employed. Moreover, the axle may remain fixed with my present device and when the tread portion of the wheel has become so worn that the wheel is no longer fit for use the wheel may be readily removed from the axle and a new wheel substituted therefor.

Having thus described the invention, what is claimed as new is:

1. The combination of a relatively stationary car axle provided near its outer end with a threaded portion and spaced inwardly from said threaded portion with an annular enlargement having a circumferential groove, a wheel having a central opening to receive the axle and provided at its inner side with an annular extension provided at its inner extremity with a longitudinally disposed annular rib, race rings disposed about the axle between the annular enlargement and the threaded portion of the same, coöperating race rings fitted in the central opening of the wheel, anti-friction devices held by and between the said race rings, a housing inclosing the axle and having its end constructed to fit within the extension of the wheel and against the adjacent race ring, said housing being provided with an annular circumferential flange fitting against the extension of the wheel and the annular rib thereon, fastening devices engaging said annular rib and the said extension, a nut fitted upon the threaded portion of the axle and retaining the race rings thereon, a cap secured to the outer side of the wheel and fitting over said nut and around the axle, and elastic washers carried respectively by the cap and the end of the housing, the washer carried by the cap bearing upon the axle and the washer carried by the housing fitting in the circumferential groove in the enlargement of the axle.

2. The combination of a relatively stationary car axle provided near its outer end with a threaded portion and spaced inwardly from said threaded portion with an annular enlargement having a circumferential groove, a wheel having a central opening to receive the axle, race rings disposed about the axle between the annular enlargement and the threaded portion, coöperating race rings fitted in the central opening of the wheel, anti-friction devices held by and between the race rings, a member secured to the inner side of the wheel and encircling the axle, a washer filling the space between the base of the annular groove and the inner surface of the said member, a nut fitted on the threaded portion of the axle and retaining the race rings thereon, a cap secured to the outer side of the wheel and fitting over said nut and around the axle, and a washer between said cap and the axle.

In testimony whereof I affix my signature.

ANDREW L. CARROLL. [L. S.]